US006320007B1

(12) United States Patent
Kazmaier et al.

(10) Patent No.: US 6,320,007 B1
(45) Date of Patent: Nov. 20, 2001

(54) PROCESS FOR PRODUCING THERMOPLASTIC RESIN POLYMERS

(75) Inventors: Peter M. Kazmaier, Mississauga; Michael K. Georges, Guelph; Richard P. N. Veregin, Mississauga; Barkev Keoshkerian, Thornhill; Gordon K. Hamer, Mississauga; Karen A. Moffat, Brantford; Marko Saban, Etobicoke, all of (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 08/345,371

(22) Filed: Nov. 18, 1994

(51) Int. Cl.$^7$ ........................................ C08F 2/00
(52) U.S. Cl. ........................ 526/204; 526/217; 526/220; 526/340; 526/346; 526/347; 526/348; 526/328; 526/227; 526/232.3
(58) Field of Search .................... 526/204, 227, 526/232.3, 220, 217, 340, 346, 347, 348, 328

(56) References Cited

U.S. PATENT DOCUMENTS

| | | |
|---|---|---|
| 3,682,875 | 8/1972 | Sullivan et al. . |
| 3,879,360 | 4/1975 | Patron et al. . |
| 3,954,722 | 5/1976 | Echte et al. . |
| 4,201,848 | 5/1980 | Kotani et al. . |
| 4,207,266 | 6/1980 | Opie . |
| 4,340,708 | 7/1982 | Gruber . |
| 4,581,429 | 4/1986 | Solomon et al. . |
| 4,736,004 | 4/1988 | Scherer, Jr. et al. . |
| 4,777,230 | 10/1988 | Kamath . |
| 5,059,657 | 10/1991 | Druliner et al. . |
| 5,130,369 | 7/1992 | Hughes et al. ................. 526/318.2 |
| 5,173,551 | 12/1992 | Caneba . |
| 5,216,096 | 6/1993 | Hattori et al. ................. 526/219.6 |
| 5,322,912 * | 6/1994 | Georges et al. ................. 526/204 |

FOREIGN PATENT DOCUMENTS

| | | |
|---|---|---|
| 0 135 280 | 3/1985 | (EP) . |
| 478838 | 7/1975 | (SU) . |

OTHER PUBLICATIONS

W. Funke, "Progress In Organic Coatings", vol. 21, Nos. 2–3, pp. 227–254, Dec. 20, 1992.
Owen W. Webster, "Living Polymerization Methods", Science, vol. 251, pp. 887–893, Feb. 22, 1991.
Charles H.J. Johnson et al. "The Application of Supercomputers in Modelling Chemical Reaction Kinetics: Kinetic Simulation of 'Quasi–Living' Radical Polymerization", Aust. J. Chem., vol. 43, pp. 1215–1230, 1990.
Ezio Rizzardo, "Living Free Radical Polymerisation," Chemistry In Austraila, Jan.–Feb. 1987, p. 32.
E.J. Rauckman et al., "Improved Methods For The Oxidation of Secondary Amines To Nitroxides", Synthetic Communications, vol. 5(6), pp. 409–413 (1975).
E.G. Rozantsev et al., Synthesis and Reactions of Stable Nitroxyl Radicals I. Synthesis, pp. 190–202, 1971.
E.G. Rozantsev, Free Nitroxyl Radicals, pp. 67–73.
Michiko Iwamura et al., "Novel Radical 1,3–Addition to Nitrones", Short Communications, vol. 40, No. 3, p. 702.
Hans–Georg Elias et al, Macromolecules.2, p. 719.
J. Kochi, "Free Radicals", vol. I, 16–24, 126–129, 278–281 and 90–293, Wiley, New York, 1973.
J.K. Kochi, "Free Radicals", vol. II, 88–89, 122–125, 132–135, 166–167 and 382, Wiley, New York, 1973.
DC Non Nekel et al., Free–Radical Chemistry, 140–145, 196–203, 208–209, 212–213, 216–217 and 238–241, Cambridge, 1974.
D. Solomon et al., "A New Method for Investigating the Mechanism of Initiation of Radical Polymerization," *Polymer Bulletin*, vol. 1, pp. 529–534 (1979).
P. Griffiths et al., "Initiation Pathways in the Polymerization of Alkyl Methacrylates with tert–Butoxy Radicals," *J. Macromol. Sci.–Chem.*, A17(1), pp. 45–50 (1982).
G. Moad et al., "Selectivity of the Reaction of Free Radicals with Styrene," *Macromolecules*, vol. 15, pp. 909–914 (1982).
G. Moad et al., "The Reaction of Acyl Peroxides with 2,2,6,6–tetramethyl–piperidinyl–1–oxy," *Tetrahedron Letters*, vol. 22, pp. 1165–1168 (1981).
G. Moad et al., "The Reaction of Benzoyloxy Radicals with Styrene—Implications Concerning the Structure of Polystyrene," *J. Macromol. Sci.–Chem.*, A17(1), pp. 51–59 (1982).
P. Griffiths et al., "Synthesis of the Radical Scavenger 1, 1, 3, 3–tetramethylisoindolin–2–yloxyl," *Aust. J. Chem.*, vol. 36, pp. 397–401 (1983).
G. Moad et al., "Reactions of Benzoyloxy Radicals With Some Common Vinyl Monomers." *Makromol Chem. Rapid Commun.*, vol. 3, pp. 533–536 (1982).
P. Griffiths et al., "Quantitative Studies of Free Radical Reactions With the Scavenger 1,1,3,3,–tetramethyl–isoindolinyl–2–oxy," *Tetrahedron Letters*, vol. 23, pp. 1309–1312 (1982).

(List continued on next page.)

Primary Examiner—David W. Wu
Assistant Examiner—Ling-Siu Choi
(74) Attorney, Agent, or Firm—Oliff & Berridge, PLC

(57) ABSTRACT

A free radical polymerization process for the preparation of a thermoplastic resin or resins includes the in situ formation of a stable free radical agent from a precursor material in a reactor vessel, introducing a free radical initiator and at least one polymerizable monomer compound into the reactor vessel, and heating a mixture of the free radical initiator, the stable free radical agent, and the polymerizable monomer compound(s) in the reactor vessel to form a thermoplastic resin.

15 Claims, No Drawings

OTHER PUBLICATIONS

E. Rizzardo et al., "Initiation Mechanisms in Radical Polymerizations: Reaction of Cumyloxy Radicals with Methyl Methacrylate and Styrene," *Aust. J. Chem.*, vol. 35, pp. 2013–2024 (1982).

M. Cuthbertson et al., "Head Addition of Radicals to Methyl Methacrylate," *Polymer Bulletin*, vol. 6, pp. 647–651 (1982).

G. Moad et al., "On the Regioselectivity of Free Radical Processes: Reactions of Benzoyloxy, Phenyl and t–Butoxy Radicals with Some α,β–Unsaturated Esters," *Aust. J. Chem.*, vol. 36, pp. 1573–1588 (Aug. 1983).

A. V. Trubnikov et al., "Inhibition of Polymerization of Vinyl Monomers Using Nitride and Iminoxide Radicals," *Vysokomol. Soedin.*, Ser. A, vol. 20, No. 11, pp. 2448–2454 (1978).

E. G. Rozantsev et al, "Synthesis and Reactions of Stable Nitroxyl Radicals II. Reactions," *Synthesis*, pp. 401–414 (Aug. 1971).

G. Moad et al., "A Product Study of the Nitroxide Inhibited Thermal Polymerization of Styrene," *Polymer Bulletin*, vol. 6, pp. 589–593 (1982).

R. Grant et al., "Solvents Effects on the Reaction of t–Butoxy Radicals with Methyl Methacrylate," *Aust. J. Chem.*, vol. 36, pp. 2447–2454 (1983).

S. Bottle et al., "The Mechanism of Initiation in the Free Radical Polymerization of N–Vinylcarbazole and N–Vinylpyrrolidone," *European Polymer J.*, vol. 25, pp. 671–676 (1989).

M. D. Gol'dfein et al., "Inhibition of Styrene Polymerization by the Stable Radical 4,4'–diethoxydiphenylnitroxide," *Vysokomol. Soedin.*, Ser. A, vol. 16, No. 3, pp. 372–376 (1974).

M. D. Gol'dfein et al., "Effect of Free Stable Radicals on the Kinetics and Mechanism of Polymerization of Some Vinyl Monomers," *Vysokomol. Soedin.*, Ser. A, vol. 17, No. 8, pp. 1671–1671 (1975).

A. V. Trubnikov et al., "Effect of Stable Radicals on Polymerization of Styrene," *Vysokomol. Soedin.*, Ser. B, vol. 18, No. 6, pp. 419–422 (1976).

A. V. Trubnikov et al., "Mechanism of Inhibition of Vinyl Monomer Polymerization by Stable Radicals," *Vysokomol. Soedin.*, Ser. B, vol. 18, No. 10, pp. 733–736 (1976).

* cited by examiner

PROCESS FOR PRODUCING THERMOPLASTIC RESIN POLYMERS

BACKGROUND OF THE INVENTION

This invention relates to polymers with controlled narrow molecular weight distributions, and a polymerization process for producing such compositions. This invention also relates to a method for preparing stable free radical agents from precursor materials for use in the polymerization process. The process is particularly useful in the production of thermoplastic polymer resins for use in a wide variety of thermoplastic applications. The present invention also relates to the formation of a stable free radical agent, and the stable free radical polymerization of a monomer or monomers in a single pot reactor environment, to produce such polymer compositions.

The thermoplastic polymer resin compositions of the present invention may be formed into a variety of thermoplastic products, for example by known processes such as injection and blow molding processes. Examples of such thermoplastic products include resins for electrostatographic toner and developer compositions, and narrow polydispersity polymers for applications including, but not limited to, adhesive formulations, surfactants and viscosity modifiers.

One way to prepare polymers or copolymers having a narrow molecular weight distribution or polydispersity is by anionic processes. However, the use and availability of resins having narrow polydispersities in industrial applications is limited because anionic polymerization processes must be performed in the absence of atmospheric oxygen and moisture, and because they require hazardous initiator reagents that are difficult to handle. Consequently, such anionic polymerization processes are generally limited to batch reactors. In addition, the monomers and solvents that are used must be anhydrous and of high purity, rendering the anionic process more expensive than alternative processes that do not have these requirements. Thus, anionic polymerization processes are difficult and costly. It is therefore desirable to have a free radical polymerization process that would provide narrow molecular weight distribution resins that overcome the shortcomings and disadvantages of the aforementioned anionic polymerization processes.

Free radical polymerization processes are chemically less sensitive to impurities in the monomers or solvents typically used and are completely insensitive to water. Consequently there has been a long felt need for an economical free radical polymerization process that is suitable for preparing narrow polydispersity resins by suspension, solution (bulk or neat), emulsion and related processes.

Most copolymers prepared by free radical polymerization processes have broad molecular weight distributions or polydispersities, for example greater than about four. One reason is that free radical initiators have half lives that are relatively long, from several minutes to many hours, and polymeric chains are not all initiated at the same time. As a result, the free radical initiators provide growing chains of various lengths at any given time during the polymerization process. Another reason for the relatively high polydispersities is that the propagating chains in a free radical process can react with each other in processes known as coupling and disproportionation, both of which are chain terminating reactions. In doing so, chains of varying lengths are terminated at different times during the polymerization reaction process, which results in resin products comprised of polymeric chains that vary widely in length from very small to very large. Furthermore, "dead" (non-reactive) polymer is formed very early in the reaction process, sometimes within milliseconds of initiation of the reaction, thus producing polymer in the early stages of the reaction having molecular weights that are different from the molecular weight of polymer formed at the end of the reaction. The different molecular weight polymers are generally caused by changes in process conditions during the course of the reaction, such as changes in the viscosity/monomer concentration and heat transfer properties of the reaction medium. The result is a further broadening of the polydispersity of resins prepared in the conventional way.

If a free radical polymerization process is to be enabled for producing narrow molecular weight distributions, then all polymer chains in the reaction must be initiated at about the same time and premature termination by coupling or disproportionation processes must be avoided.

In a hypothetical free radical polymerization of styrene, in which chains are continually initiated over the course of the polymerization, and where chain termination by coupling processes is also occurring, calculations have shown that the narrowest polydispersity that one can theoretically possibly obtain is 1.5. Such calculations are described in, for example, G. G. Odian, *Principles of Polymerization,* pages 280–281., 2nd Ed., John Wiley & Sons, 1981. In practice, polydispersities greater than 1.5 are actually obtained. Polydispersities of between 2.0 and 2.4 are typical for free radical homopolymerizations of styrene. In the case of copolymer systems, polydispersities of greater than 4 are generally obtained.

The use of stable free radicals as inhibitors of free radical polymerization is known and is described, for example, in G. Moad et al., *Polymer Bulletin,* vol. 6, p. 589 (1982). Studies have also reported on the use of stable free radicals as inhibitors of free radical polymerization performed at low temperatures and at low monomer to polymer conversation rates. See, for example, G. Moad et al., *Macromol Sci.-Chem.,* A17(1), 51 (1982).

The stable free radicals are generally formed from precursor materials according to known reaction mechanisms. For example, the synthesis of nitroxides from amine precursors is described in E. G. Rozantsev and V. D. Sholle, *Synthesis,* 190–202 (1971) and E. J. Rauckman, G. M. Rosen and M. B. Abou-Donia, *Synthetic Communications,* 409–413 (1975). Other procedures for the synthesis of nitroxide include, for example, the oxidation of hydroxylamines, such as described in E. G. Rozantsev, *Free Nitroxyl Radicals,* 70–73 (Plenum Press, New York), and radical addition to Nitrones, for example as described in I. Iwamura and N. Inamoto, *Bulletin of the Chemical Society of Japan,* 40, 703 (1967). The disclosures of all of the preceding references are entirely incorporated herein by reference.

Roland P. T. Chung and David H. Solomon, "Recent Developments in Free-Radical Polymerization—A Mini Review," *Progress in Organic Coatings,* vol. 21, pp. 227–254 (1992), presents an overview of the free radical polymerization process, with an emphasis on recent developments.

U.S. Pat. No. 5,322,912 to Georges et al. discloses a free radical polymerization process for the preparation of thermoplastic resins. The thermoplastic resins are disclosed as having a molecular weight of from 10,000 to 200,000 and a polydispersity of from 1.1 to 2.0. The process comprises heating a mixture of a free radical initiator, a stable free radical agent, and at least one polymerizable monomer compound to form a thermoplastic resin with a high monomer to polymer conversion ratio, and then cooling said mixture. The polymerization process is carried out at a temperature of from 60 to 160° C. and at a relatively low pressure of about 60 psi (about 4 bars). The process optionally comprises isolating the thermoplastic resin or resins and washing and drying the thermoplastic resin. The patent also discloses the preparation of mixtures and block copolymer thermoplastic resins using the free radical polymerization process. Resins produced by the disclosed process are described as having a narrow molecular weight distribution, and a modality that is controlled by the selection of the free radical initiator and stable free radical agent. As the stable free radical agent, the patent discloses the use of nitroxide free radicals such as PROXYL, TEMPO, and derivatives thereof.

U.S. Pat. No. 4,581,429 to Solomon et al. also discloses the incorporation of a stable free radical agent into a free radical polymerization process. The patent discloses that a nitroxide radical may be added to the polymerization process to stabilize the growth of polymer chains. The molecular weights of the polymer products obtained are generally from about 2,500 to 7,000 and have polydispersities generally of from about 1.4 to 1.8. The reactions typically have low monomer to polymer conversion rates and use relatively low reaction temperatures, of less than about 100° C., and use multiple stages.

U.S. Pat. No. 4,581,429 discloses a free radical polymerization process that controls the growth of polymer chains to produce short chain or oligomeric homopolymers and copolymers, including block and graft copolymers. The process employs an alkoxyamine initiator having the formula, in part, =N—O—X, where X is a free radical species capable of polymerizing unsaturated monomers. The reference discloses that the alkoxyamine free radical initiator may be formed in situ prior to its use in a free radical polymerization process by heating a nitroxide radical in the presence of a stoichiometric amount of carbon centered free radical (X). For example, the reference discloses the formation of the alkoxyamine free radical initiator 1-(1-cyano-1-methylethoxy)2,2,5,5-tetramethylpyrrolidine from a degassed solution in benzene of azobisisobutyronitrile and 2,2,5,5-tetramethylpyrrolidin-1-yloxy (the stable free radical agent PROXYL, which is equivalent to the structure 2,2,5,5-tetramethyl-1-pyrrolidinyloxy specified for PROXYL below). The reference also discloses the formation of the alkoxyamine free radical initiator 1-(1-cyano-4-hydroxy-1-methylbutoxy)2,2,6,6-tetramethylpiperidine from a degassed solution in ethyl acetone of 4,4'-azobis(4-cyano-n-pentanol) and 2,2,6,6-tetramethylpiperidin-1-yloxy (the stable free radical agent TEMPO, which is equivalent to the structure 2,2,6,6-tetramethyl-1-piperidinyloxy specified for TEMPO below). As to formation of the nitroxide radicals (such as TEMPO and PROXYL) the reference discloses only that they may be readily prepared by the oxidation of the appropriate secondary amine or hydroxylamine, reduction of the appropriate nitro or nitroso compound, or by the addition of free radicals to nitrones. The reference does not disclose the in situ formation of a stable free radical agent followed by a free radical polymerization process.

U.S. Pat. No. 4,777,230 to Kamath discloses a free radical polymerization process for producing polymers, wherein monomers are blended with a solvent, polymerization initiators (such as peroxide initiators) and an optional chain transfer agent. The polymerization process is conducted at a temperature of from about 90° C. to about 200° C. The resultant polymers have a molecular weight distribution of from about 1.5 to about 2.5, and an average molecular weight of less than about 4,000.

It has been demonstrated that stable free radical polymerization processes can provide precise control over the molecular weight distribution of polymer chains. For example, U.S. Pat. No. 5,322,912, described above, describes polymerization processes that use stable free radicals to provide thermoplastic resins having a narrow molecular weight distribution. Although it is not desired to be limited by theory, it is believed that when polymerization reaction processes are performed at temperatures above about 100° C., all of the polymer chains are initiated at about the same time. Therefore, control of the reaction enables the formation of polymer chains having a precise molecular weight and a narrow molecular weight distribution. Incorporation of stable free radical agents in the polymerization process prevents the initiation of new polymer chains after an initial reaction during which all of the polymer chains are initiated at about the same time.

Although the stable free radical polymerization process for producing thermoplastic polymer resins has been demonstrated to work very well, the breadth of application of the polymerization process has been constrained by economic considerations. A problem with the stable free radical polymerization process has been the relatively high cost of the stable free radical agents, which in turn results in a relatively higher cost for the thermoplastic resin product.

SUMMARY OF THE INVENTION

The need continues to exist in the thermoplastic resin industry for improved processes for the production of thermoplastic polymer resins. Although the stable free radical polymerization process achieves the goal of providing thermoplastic polymer resins with improved processing characteristics and narrow molecular weight distributions, the application of the stable free radical polymerization process may be expanded if the cost of the process can be reduced. We have discovered that a process for preparing the relatively expensive stable free radical agent from relatively inexpensive amine precursor materials may be combined with a stable free radical polymerization process, in a single reactor vessel, to form thermoplastic resin polymers. Such a process for producing the stable free radical agent, combined with the free radical polymerization process, and improved thermoplastic polymer resins are provided herein.

Specifically, this invention provides a free radical polymerization process for the preparation of a thermoplastic resin or resins, comprising:

a) forming a stable free radical agent from a precursor material in a reactor vessel;

b) introducing a free radical initiator and at least one polymerizable monomer compound into said reactor vessel;

c) heating a mixture comprised of said free radical initiator, said stable free radical agent, and said at least one polymerizable monomer compound in said reactor vessel to form a thermoplastic resin.

The stable free radical polymerization process of the present invention may readily afford polydispersities of between about 1.1 and 2.0, and at least as low as 1.5 for various copolymer systems. Stable free radical polymerization systems of the present invention afford polydispersities that are comparable to those obtained in anionic polymerizations, but avoiding the above-described shortcomings and disadvantages of the anionic polymerization processes.

The thermoplastic polymer resins of the present invention are useful as substitutes for the polymers and copolymers currently used in the thermoplastic resin industries. The stable free radical polymerization process disclosed herein is particularly useful in the production of such thermoplastic polymer resins having a narrow molecular weight distribution. The stable free radical polymerization process of the present invention also advantageously combines the production of the stable free radical agent from precursor materials with the actual stable free radical polymerization process in a single reactor vessel, while substantially reducing the cost of the polymerization process.

DETAILED DESCRIPTION OF PREFERRED EMBODIMENTS

The free radical polymerization process of the present invention may be conducted using any of the various stable free radical agents known in the art. However, an advantage of the present invention is that the stable free radical polymerization process may be conducted in the same reactor vessel that may be used for producing the stable free radical agents from precursor materials. That is, in embodiments, precursor materials may be introduced into a reactor vessel, reacted to form the stable free radical agent for use in a subsequent stable free radical polymerization process, polymerization coreagents may be added to the same reactor vessel, and the stable free radical polymerization process may be carried out to completion. This process may be used to produce thermoplastic resins, including polymer and block copolymer resins, having a number average molecular weight in the range of from about 1,000 to about 1,000,000.

Stable free radical agents are known in the literature. For example G. Moad et al., Tetrahedron Letters, 22, 1165 (1981), which is totally incorporated herein by reference, discloses stable free radical agents as free radical polymerization inhibitors. However, under the free radical polymerization conditions of the present invention, stable free radical agents function as moderators to harness the normally highly reactive and indiscriminate intermediate free radical species. Stable free radical agents are disclosed in U.S. Pat. No. 5,322,912, the entire disclosure of which is incorporated herein by reference. Preferred free radical agents for use in the present invention include those in the nitroxide group of free radicals, for example, PROXYL (2,2,5,5-tetramethyl-1-pyrrolidinyloxy) and derivatives thereof, TEMPO (2,2,6,6-tetramethyl-1-piperidinyloxy) and derivatives thereof, DOXYL (4,4-dimethyl-3-oxazolinyloxyl) and derivatives thereof, mixtures thereof and the like.

Although the stable free radical agents are readily available for direct use in the stable free radical polymerization processes, such stable free radical agents are generally available only at a relatively high cost. However, we have discovered that an oxidation reaction of the stable free radical agent precursor materials, to form the stable free radical agent, may be readily incorporated into the stable free radical polymerization process. As such, in embodiments of the present invention, the stable free radical agent may be prepared by oxidation of precursor materials in either an aqueous, mixed or completely organic solvent system. Generally, the precursor materials comprise amines, which are relatively inexpensive as compared to the stable free radical agents themselves.

For example, the stable free radical agent TEMPO may be readily prepared from its precursor amine, 2,2,6,6-tetramethyl-1-piperidine, for example by oxidation. The TEMPO stable free radical agent may also be readily prepared, for example, from the precursor 2,2,6,6-tetramethyl-1-piperidone. Similarly, the stable free radical agent PROXYL may be prepared from its precursor amine, 2,2,5,5-tetramethyl-1-pyrrolidine.

Because the reaction mechanisms and parameters of the various processes for forming the stable free radical agent are generally known, such as the oxidation of a precursor amine, the reactions will not be discussed in detail herein. The mechanisms are discussed, for example, in the following references: E. G. Rozantsev and V. D. Sholle, *Synthesis,* 190–202 (1971); E. J. Rauckman, G. M. Rosen and M. B. Abou-Donia, *Synthetic Communications,* 409–413 (1975); E. G. Rozantsev, *Free Nitroxyl Radicals,* Plenum Press (New York), 70–73; and I. Iwamura and N. Inamoto, *Bulletin of the Chemical Society of Japan,* Vol. 40, 703 (1967). The entire disclosures of these references are incorporated herein by reference.

Once the actual stable free radical agent has been produced from the precursor materials, the solution of the stable free radical agent may be used directly in a stable free radical polymerization process, or the stable free radical agent may be isolated from its solution, and subsequently used in the stable free radical polymerization process. For example, the stable free radical agent may be isolated from its solution by passing the solution of freshly synthesized stable free radical agent through a column packed with a separation material such as silica gel, alumina, ion exchange resin, florisil and the like. The stable free radical agent can be isolated by extraction, followed by precipitation with a non-solvent. Alternatively, the stable free radical agent can be purified by sublimation. Similar purification techniques for isolating stable organic compounds, such as the stable free radical agent, are known to those skilled in the art.

If the stable free radical agent is not isolated from the solution in which it is produced, it may be necessary to destroy any excess oxidizing agents still present in the solution. For example, in embodiments where the oxidizing agents may interfere with the polymerization of the monomer or monomers, it is preferable that the oxidizing agents be destroyed prior to commencing the stable free radical polymerization process. Specifically, destroying excess oxidizing agents may be beneficial for those systems where the monomer, monomers or other coreagents interact with the oxidizing agent. As a result, the process of the present invention is not limited to systems in which the oxidizing agent does not interact with other reagents in the system, and is therefore applicable to the polymerization of a wide range of monomers.

For most applications, however, the oxidizing agent is innocuous and does not interfere with the polymerization process. Therefore, in embodiments of the present invention, it may be preferable not to destroy excess acid remaining in the reactor vessel following the formation of the stable free radical agent. It has been found that such excess acid remaining in the reactor vessel may actually increase the efficiency of the stable free radical polymerization process, for example by increasing the polymerization rate. Therefore, in embodiments, it is preferable to ensure the presence of excess acid in the reactor vessel, either by including non-stoichiometric amounts of acid in the stable free radical agent formation step, or by adding excess acid prior to the stable free radical polymerization step. For example, a catalytic amount of a protic acid, which will not also initiate cationic polymerization, may be present in the reaction mixture. For example, the protic acid may be selected from the group consisting of organic sulfonic, phosphoric and carboxylic acids and nitrovides that contain acidic functional groups such as 3-carboxyl-PROXYL, with camphorsulfonic acid being preferred. When such a catalyst is incorporated into the reaction mixture, the molar ratio of stable free radical agent to catalytic acid may be from about 1:1 to about 11:1, with a preferred ratio of between about 1.5:1 and about 5:1. Excessive addition of catalytic acid beyond the aforementioned amounts may cause the molecular weight distribution of the resultant polymers to broaden.

Once the stable free radical agent has been produced, it may be used to produce any of a wide variety of thermoplastic polymer resins by a stable free radical polymerization process. For example, the present invention may incorporate the stable free radical polymerization processes as disclosed in U.S. Pat. No. 5,322,912, the entire disclosures of which is incorporated herein by reference.

The present invention may therefore be used to form thermoplastic resin polymers from a wide variety of monomers. The monomers that can be used are any of various monomers capable of undergoing a free radical polymerization, and include, but are not limited to, styrene, substituted styrene and derivatives thereof, for example methylstyrene, acrylates, butadiene, isoprene, myrcene, conjugated dienes and derivatives thereof, ethylene and derivatives thereof, mixtures thereof, and the like. Preferred are monomers that are sufficiently reactive under the specified stable free radical moderated polymerization reaction conditions to afford a stable free radical reaction adduct and high molecular weight polymer product. Also preferred are monomers that do not autopolymerize appreciably under the preferred reaction conditions.

Polymerization initiators may be used in the process of the present invention for their known purposes. Initiators suitable for use in the present process include, but are not limited to, free radical polymerization initiators, such as peroxide initiators and azo initiators. Preferred free radical polymerization initiators for use in the present invention may include, but are not limited to, tert-butyl peracetate, di-tert-amyl peroxide, di-tert-butyl peroxide, tert-butyl hydroperoxide, tert-amyl perpivalate, butyl per-2-ethylhexanoate, tert-butyl perpivalate, tert-butyl perneodecanoate, tert-butyl perisononanoate, tert-amyl perneodecanoate, tert-butyl perbenzoate, di-2-ethylhexyl peroxydicarbonate, dicyclohexyl peroxydicarbonate, cumyl perneodecanoate, tert-butyl permaleate, mixtures thereof and the like. Preferred peroxide initiators may include, but are not limited to, benzoyl peroxide and the like. Preferred azo initiators may include, but are not limited to, azobisisobutyronitrile and the like. Mixtures of two or more initiators can also be used, if desired.

The molar ratio of the stable free radical agent to free radical initiator may be from about 0.4:1 to about 2.5:1, and may preferably be in the range of from about 0.9:1 to about 1.6:1. Although not wanting to be limited by theory, the molar ratio of stable free radical agent to free radical initiator of about 1.3:1, as preferred in an embodiment of the present invention, is believed to be important for success of the polymerization reaction. If the molar ratio is too high then the reaction rate is noticeably inhibited at temperatures below 130° C. Above about 140–150° C., the increase in the molar ratio of the stable free radical agent to free radical initiator has little effect on the reaction rate. If the molar ratio of the stable free radical agent to free radical initiator is too low then the reaction product has an undesired increased molecular weight distribution.

The amount of stable free radical agent and free radical initiator used in the polymerization process is directly related to the amount of monomer or monomers to be polymerized. In embodiments of the present invention, the molar ratio of monomer content to stable free radical agent to free radical initiator may be in the range of from about 100:0.2:1 to about 10,000:2.5:1, and is preferably in the range of from about 300:1.3:1 to about 7,000:1.3:1. However, it should be emphasized that the above ratios for the stable free radical agent correspond to the amount of stable free radical agent that should be present in the reactor vessel upon commencing the stable free radical polymerization process. That is, the specified molar ratios for the stable free radical agent may not exactly correspond to the required molar ratio of precursor materials, due to the fact that the stable free radical agent production step may not proceed with a 100% yield. That is, if the yield of the stable free radical agent production step is less than 100%, it will be necessary to use additional amounts of precursor materials in order to produce the desired amount of stable free radical agent.

Additionally, the polymerization reaction rate of the monomer or monomers may, in embodiments of the present invention, be accelerated and the reaction time reduced by the addition of a catalyst. For example, a catalytic amount of a protic acid, which will not also initiate cationic polymerization, may be added to the reaction mixture. For example, the protic acid may be selected from the group consisting of organic sulfonic, phosphoric and carboxylic acids, with camphorsulfonic acid being preferred. When a catalyst is incorporated into the reaction mixture, the molar ratio of stable free radical agent to catalytic acid may be from about 0.1:1 to about 11:1, with a preferred ratio of between about 1.5:1 and about 5:1. Excessive addition of catalytic acid beyond the aforementioned amounts may cause the molecular weight distribution of the resultant polymers to broaden.

Additional optional known additives may be used in the polymerization reactions, provided they do not interfere with the objects of the present invention. Such additional additives may provide additional performance enhancements to the resulting product. Such optional additives may include, but are not limited to, colorants, lubricants, release or transfer agents, surfactants, stabilizers, defoamants, mixtures thereof and the like.

In embodiments, the thermoplastic resin polymers of the present invention are preferably polymerized in an inert atmosphere, i.e., with the virtual exclusion of oxygen. Embodiments of the present invention therefore conduct the stable free radical polymerization process in an inert atmosphere, such as under an argon or nitrogen blanket.

A further discussion of reaction conditions and reactants, including suitable monomers, free radical initiators, stable free radical agents, catalysts, etc. may be found in U.S. Pat. No. 5,322,912, the entire disclosure of which has been incorporated by reference.

When the polymerization reaction is completed, or at a desired suitable percent conversion prior to completion, the polymerization reaction may be quenched or terminated by reducing the reaction temperature. For example, the polymerization reaction may be terminated by reducing the processing temperature to below about 100° C., and preferably below about 40° C.; although the exact temperature depends upon the specific reactants involved.

Following completion or termination of the reaction, the resultant polymer can be optionally separated from the reaction mixture, and washed and dried. Subsequent processing of the thermoplastic resin polymer can then be conducted.

The present invention provides several specific advantages in embodiments as follows.

With the process of the present invention, the stable free radical polymerization of polymer products may be conducted in situ with the formation of the stable free radical agent from precursor materials. The present invention, in embodiments, permits both the formation of the stable free radical agent and the polymerization of polymer products using the thus-formed stable free radical agent in a single-step, single-reactor system. This so-called "Ein Topf" reaction may be used to produce narrow polydispersity polymer products in a much more efficient and economical fashion than prior art processes.

With the process of the present invention, polymer product polydispersities can be varied from between about 1.1 to about 2.0, and preferably from between about 1.1 to about 1.5, depending on the monomer/comonomer system by varying the molar concentration ratio of stable free radical agent to free radical initiator. For example, the process of the present invention may, in embodiments, provide a polystyrene polymer product having a polydispersity of between about 1.15 and about 1.25. When the polymerization process conditions of the present invention are attempted without using the stable free radical agent, broad molecular weight resins are obtained.

The stable free radical agent moderated polymerization reaction of the present invention may be performed in a variety of media such as, for example, suspension, emulsion, bulk, aqueous or non-aqueous solution. When solvent solutions are used in the polymerization process, it is preferable that higher boiling solvents be used, such as toluene and xylene.

In the stable free radical agent formation step of the present invention, the reaction time may be varied over a period of up to about 48 hours, depending upon such factors as the precursor materials and oxidation reagents being used and the stable free radical agent to be formed. Preferably, the reaction time for formation of the stable free radical agent is below about 24 hours. The optimal reaction time may also vary depending upon the temperature, the volume and scale of the reaction, and the quantity of reactants selected. Generally, the preparation of the stable free radical agent from the precursor materials may be conducted at a temperature of from about −40° C. to about 125° C., subject to the limitations of the solvent system. Preferably, the stable free radical agent in the process of the present invention is prepared at a temperature of from about 20° C. to about 40° C.

In embodiments of the present invention, it is preferable to use the stable free radical agent directly in a stable free radical polymerization process by introducing the polymerization reaction reactants directly into the reactor vessel, either before, during or after the stable free radical agent formation reaction. During the reaction of monomer or mixed monomers to form polymers, the reaction time may be varied over a period of up to about 70 hours, preferably below about 10 hours and optimally below about 7 hours. More preferably, the reaction time is between about 3 hours and about 7 hours. The optimal reaction time may vary depending upon the temperature, the volume and scale of the reaction, the quantity and type of polymerization initiator and stable free radical agent selected, and the effects of any excess acid or other oxidation reagents present during the polymerization process.

The polymerization reaction temperature may be kept relatively constant throughout the polymerization reaction step by providing an adjustable external heat source. The temperature of the reaction vessel is preferably maintained at between about 60° C. and about 160° C., and may preferably be maintained at between about 100° C. and about 150° C. Optimally, in embodiments, the temperature of the reactor vessel is maintained at from about 120° C. to about 140° C. It has been found that reactions performed for some monomers such as styrene above about 160° C. tend to result in a broadening of the polydispersity.

A reaction volume of the reactor vessel may be selected for any size that enables simple addition of reagents, mixing, reaction, and isolation of the product resins on an economic or convenience scale.

The following examples illustrate specific embodiments of the present invention, but do not limit the scope of the invention. One skilled in the art will recognize that the appropriate reaction parameters, reagents and component ratios may be adjusted as necessary to achieve specific stable free radical agent and/or polymer product characteristics. All parts and percentages are by weight unless otherwise indicated.

EXAMPLES

Example I

To a xylene solution of 2,2,6,6-tetramethyl-1-piperidine (0.5 g in 5 mL of xylene) is added m-chloroperoxybenzoic acid in the molar ratio of 2 moles of peracid for each mole of amine. While maintaining the temperature at 25° C., the reaction is permitted to proceed for 5 hours. During the 5 hour period, formation of TEMPO is observed by the appearance of an orange-red color indicative of a solution of the stable free radical agent TEMPO.

A solution of styrene (15 g, 0.144 mole), benzoyl peroxide (0.385 g, 0.0016 mole) and TEMPO (0.292 g, 0.0019 mole), prepared as indicated above, is heated under an argon blanket for 3.5 hours at 95° C. It is assumed, based on the half life of benzoyl peroxide and that TEMPO is known to act as a promoter for the dissociation of benzoyl peroxide, that no benzoyl peroxide remains in the reaction mixture after this time. The reaction mixture is heated in an oil bath maintained at 123° C. over a period of 45 minutes, and the reaction is continued at this temperature for 69 hours. Samples are removed from the reaction mixture over the course of the reaction as indicated and the molecular weight properties of the polystyrene products and percent conversion values of the samples are summarized in Table I.

This Example demonstrates that the reaction can be conveniently accomplished in the absence of a solvent or in bulk. As indicated by the incremental increase in molecular weight, the reaction appears to be proceeding via a pseudo-living mechanism. The molar ratio of TEMPO to benzoyl peroxide is 1.3:1. After the initial 95° C. heating period, no polymeric material is observed by gel permeation chromatography. Reacting this mixture in an oil bath maintained at 123° C. results in a very narrow polydispersity of 1.26. This very narrow polydispersity is below the theoretical calculated value of 1.5 for normal free radical polymerization processes of styrene, and does not increase with percent conversion. This Example also provides a demonstration of achieving a high percent conversion of monomers to polymer while retaining a narrow polydispersity in the polymeric resin products.

TABLE I

| Example I | Reaction Time (hr) | Mn (10³) | Mw (10³) | PD | Conversion (%) |
|---|---|---|---|---|---|
| Ia | 21 | 1.7 | 2.2 | 1.28 | 20 |
| Ib | 29 | 3.2 | 4.1 | 1.27 | 51 |
| Ic | 45 | 6.8 | 8.2 | 1.21 | 76 |
| Id | 69 | 8.7 | 10.9 | 1.26 | 90 |

Example II

A solution of water and ethylene glycol is formed by mixing one part by volume of water with three parts by volume of ethylene glycol. To the solution is added a solution of 2,2,6,6-tetramethyl-1-piperidine (0.83 g in 5 mL of solvent), sodium bicarbonate (0.4 g per 1 g of 2,2,6,6-tetramethyl-1-piperidine), 50% hydrogen peroxide (1.3 mL), and sodium tungstate (0.056 g). A reaction is allowed to proceed for 24 hours, during which time the formation of TEMPO is observed by the appearance of an orange-red color. The solution containing the TEMPO stable free radical agent may be used directly in a stable free radical polymerization process without isolating the TEMPO from the solution.

Sodium styrene sulfonate (log), sodium bisulfite (0.33 g) and ammonium persulfate are added to the reaction mixture and heated at 74° C. for one hour. The reaction is then heated at reflux for 5 hours. This stable free radical polymerization process yields narrow polydispersity resins.

What is claimed is:

1. A free radical polymerization process for the preparation of a thermoplastic resin, comprising:
   (a) forming a nitroxide stable free radical agent from a precursor material in a reactor vessel;
   (b) introducing a free radical initiator and at least one polymerizable monomer compound into said reactor vessel; and
   (c) heating a mixture comprised of said stable free radical initiator, said nitroxide stable free radical agent, and said at least one polymerizable monomer compound in said reactor vessel at a temperature of from about 100° C. to about 160° C. to form a thermoplastic resin having a molecular weight distribution of from about 1.1 to about 2.0.

2. A process according to claim 1, wherein said precursor material is an amine.

3. A process according to claim 1, wherein said precursor material is selected from the group consisting of 2,2,5,5-tetramethyl-1-pyrrolidine, 2,2,6,6-tetramethyl-1-piperidine, 2,2,6,6-tetramethyl-1-piperidone and mixtures thereof.

4. A process according to claim 1, wherein said nitroxide stable free radical agent is selected from the group consisting of 2,2,5,5-tetramethyl-1-pyrrolidinyloxy, derivatives thereof, 2,2,6,6-tetramethyl-1-piperidinyloxy, derivatives thereof, 4,4-dimethyl-3-oxazolinyloxyl, derivatives thereof, and mixtures thereof.

5. A process according to claim 1, wherein said formation step (a) comprises oxidizing said precursor material with an oxidizing agent.

6. A process according to claim 5, wherein excess oxidizing agent existing in a solution of said nitroxide stable free radical agent formed in said formation step (a) is not destroyed or neutralized prior to said heating step (c).

7. A process according to claim 1, wherein said step (b) is conducted after formation of the nitroxide stable free radical agent in said formation step (a).

8. A process according to claim 1, wherein said formation step (a) comprises heating said precursor material for up to about 40 hours.

9. A process according to claim 1, wherein said heating step (c) is conducted in an inert atmosphere.

10. A process according to claim 1, wherein said thermoplastic resin has a molecular weight distribution of from about 1.1 to about 1.5.

11. A process according to claim 1, wherein said heating step (c) comprises heating said mixture for up to about 70 hours.

12. A process according to claim 1, wherein said at least one polymerizable monomer compound is selected from the group consisting of styrene and derivatives thereof, conjugated dienes and derivatives thereof, acrylate and derivatives thereof, ethylene and derivatives thereof, and mixtures thereof.

13. A process according to claim 1, wherein said mixture is heated in said heating step (c) for between about 3 and about 7 hours.

14. A process according to claim 1, wherein said thermoplastic resin has a number average molecular weight of from about 1,000 to about 1,000,000.

15. A free radical polymerization process for the preparation of a thermoplastic resin, comprising:
   (a) forming a nitroxide stable free radical agent from a precursor material in a reactor vessel;
   (b) introducing a free radical initiator and at least one polymerizable monomer compound into said reactor vessel; and
   (c) heating a mixture comprised of said stable free radical initiator, said nitroxide stable free radical agent, and said at least one polymerizable monomer compound in said reactor vessel to form a thermoplastic resin.

* * * * *